(12) United States Patent
Lam et al.

(10) Patent No.: US 11,570,141 B2
(45) Date of Patent: Jan. 31, 2023

(54) COORDINATING TRANSACTIONS FOR DOMAIN NAMES ADMINISTERED USING A DOMAIN NAME PORTFOLIO

(71) Applicant: Afilias Limited, Dublin (IE)

(72) Inventors: Jimmy Lam, Toronto (CA); Hui Zhou, Toronto (CA); Shuqin Sun, Toronto (CA); Michael Runcieman, Toronto (CA)

(73) Assignee: AFILIAS LIMITED, Dublin (IE)

( * ) Notice: Subject to any disclaimer, the term of this patent is extended or adjusted under 35 U.S.C. 154(b) by 529 days.

(21) Appl. No.: 16/410,527

(22) Filed: May 13, 2019

(65) Prior Publication Data

US 2020/0366644 A1 Nov. 19, 2020

(51) Int. Cl.
*G06F 15/16* (2006.01)
*H04L 61/3015* (2022.01)
*G06Q 20/12* (2012.01)
*G06Q 20/24* (2012.01)
*G06Q 20/26* (2012.01)
*H04L 61/4511* (2022.01)

(52) U.S. Cl.
CPC ....... *H04L 61/302* (2013.01); *G06Q 20/1235* (2013.01); *G06Q 20/24* (2013.01); *G06Q 20/26* (2013.01); *H04L 61/4511* (2022.05)

(58) Field of Classification Search
CPC .............. H04L 61/302; H04L 61/1511; G06Q 20/1235; G06Q 20/24; G06Q 20/26
USPC ......................................... 709/245; 705/27.1
See application file for complete search history.

(56) References Cited

U.S. PATENT DOCUMENTS 9,953,105 B1 * 4/2018 Gupta ..................... H04L 67/02
2009/0119198 A1 * 5/2009 Manriquez ............. G06Q 40/04
705/37

(Continued)

FOREIGN PATENT DOCUMENTS

EP 3240261 A1 * 11/2017 ......... H04L 61/3005
EP 3739533 A1 * 11/2020 ......... H04L 61/1511

*Primary Examiner* — Yves Dalencourt
(74) *Attorney, Agent, or Firm* — Haynes and Boone, LLP

(57) ABSTRACT

A method for coordinating transactions for domain names to register a plurality of domain names with a domain name portfolio stored in a storage, such that each of the domain names in a plurality of domain names belongs to only the domain name portfolio as a unique member of the domain name portfolio; associate a portfolio account with the domain name portfolio, the portfolio account configured for managing a pool of funds available for use in payment of the transactions for said each of the domain names of the plurality of domain names; receive credit payment instructions attributed to the portfolio account, the credit payment instructions containing a credit payment amount; record the credit payment amount against the pool of funds in order to increase a level of the pool of funds; receive debit payment instructions associated with a domain name of the domain name portfolio and domain name transaction information associated with the transaction for the domain name; record the debit payment amount against the pool of funds in order to decrease the level of the pool of funds; and generate and send a periodic report over the network detailing the level of the pool of funds and the transaction applied against two or more of the domain names as members of the domain name portfolio.

29 Claims, 4 Drawing Sheets

(56) References Cited

U.S. PATENT DOCUMENTS

| | | | |
|---|---|---|---|
| 2009/0265415 A1* | 10/2009 | Harry | G06Q 30/02 |
| | | | 709/202 |
| 2015/0212710 A1* | 7/2015 | Gupta | G06Q 30/0641 |
| | | | 705/27.1 |
| 2016/0098153 A1* | 4/2016 | Gupta | G06F 3/0483 |
| | | | 715/765 |
| 2016/0117789 A1* | 4/2016 | Ptalis | G06Q 50/188 |
| | | | 705/80 |

* cited by examiner

COORDINATING TRANSACTIONS FOR DOMAIN NAMES ADMINISTERED USING A DOMAIN NAME PORTFOLIO

FIELD

The present invention is related to coordinating transactions for domain names.

BACKGROUND

Currently, it is overly complicated for registrants to manage all of their TLDs, especially in a multi TLD environment. It is common in today's environment for a registrant to utilize a separate account for each TLD managed by a registry operator. Accordingly, the registrant must utilize different login credentials for each account for a respective TLD, as well as to manage disparate pools of funds to pay for actions (e.g. renew) implemented on the TLD by the registry operator.

BRIEF DESCRIPTION OF THE DRAWINGS

Exemplary embodiments of the invention will now be described in conjunction with the following drawings, by way of example only, in which.

SUMMARY

Figure 1:
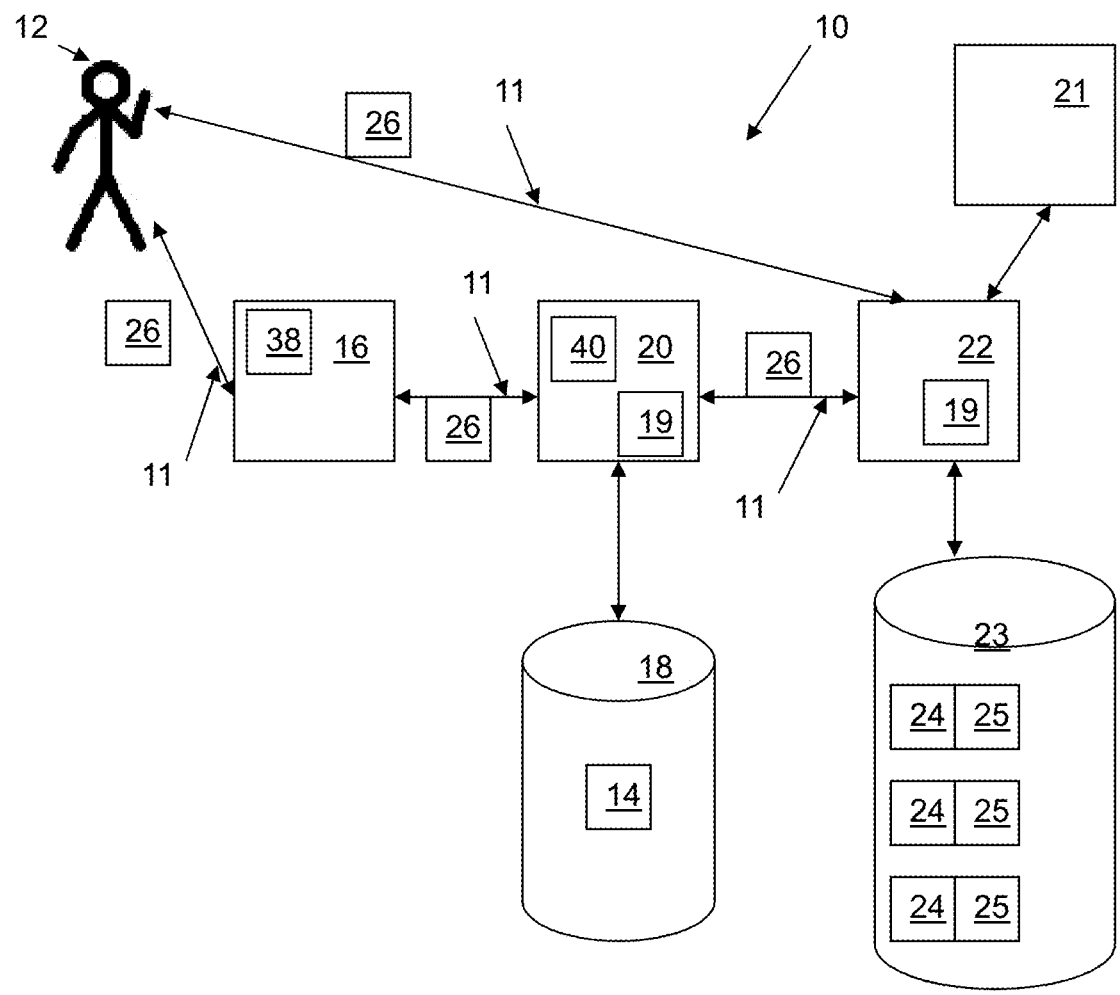
FIG. 1 is a block diagram of components of a domain name system.

It is an object of the present invention to provide a system and method to coordinate transactions to obviate or mitigate at least some of the above presented disadvantages.

A first aspect provided is a method for coordinating transactions for domain names to register a plurality of domain names with a domain name portfolio stored in a storage, such that each of the domain names in a plurality of domain names belongs to only the domain name portfolio as a unique member of the domain name portfolio; associate a portfolio account with the domain name portfolio, the portfolio account configured for managing a pool of funds available for use in payment of the transactions for said each of the domain names of the plurality of domain names; receive credit payment instructions attributed to the portfolio account, the credit payment instructions containing a credit payment amount; record the credit payment amount against the pool of funds in order to increase a level of the pool of funds; receive debit payment instructions associated with a domain name of the domain name portfolio and domain name transaction information associated with the transaction for the domain name; record the debit payment amount against the pool of funds in order to decrease the level of the pool of funds; and generate and send a periodic report over the network detailing the level of the pool of funds and the transaction applied against two or more of the domain names as members of the domain name portfolio.

A second aspect provided is a system for coordinating transactions for domain names, the system comprising: a computer processor coupled to a memory for implementing instructions stored on the memory to: register via a portfolio management module a plurality of domain names with a domain name portfolio stored in a storage, such that each of the domain names in a plurality of domain names belongs to only the domain name portfolio as a unique member of the domain name portfolio; associate a portfolio account with the domain name portfolio, the portfolio account configured for managing a pool of funds available for use in payment of the transactions for said each of the domain names of the plurality of domain names; receive credit payment instructions attributed to the portfolio account, the credit payment instructions containing a credit payment amount; record the credit payment amount against the pool of funds in order to increase a level of the pool of funds; receive debit payment instructions associated with a domain name of the domain name portfolio and domain name transaction information associated with the transaction for the domain name; record the debit payment amount against the pool of funds in order to decrease the level of the pool of funds; and generate and send a periodic report over the network detailing the level of the pool of funds and the transaction applied against two or more of the domain names as members of the domain name portfolio.

DETAILED DESCRIPTION

Domain Name Management and Registration System 10

Referring to FIG. 1, shown is a domain name management and registration system 10 providing for a domain name registrant 12 (e.g. domain owner) to request 26 and obtain over a communications network 11 a domain name 14 from a domain name registrar 16 for domain name 14 available (e.g. not yet claimed) in a domain name registry 18 (e.g. a database of all domain names registered in a top-level domain (TLD)), which is managed by a registry operator 20 that also generates zone files which convert domain names to IP addresses. The domain name management and registration system 10 can also provide for the domain name registrant 12 to manage over the communications network 11 the domain name 14, via the domain name registrar 16, for instructions 26 and any associated payments relating to their domain names 14 already registered (e.g. claimed) in the domain name registry 18. The domain name management and registration system 10 includes a domain name portfolio management module 19 that can be hosted by a service provider 22 (e.g. technical services provider to the registry operator 20) or can be hosted by the registry operator 20 themselves.

For sake of convenience, the following description of the domain name portfolio management module 19 is with respect to hosting by the service provider 22, by example only, recognizing that the registry operator 20 itself could also host the domain name portfolio management module 19 rather than the service provider 22. As such, any instructions 26 communicated by the registrar 16 directly to the service provider 22 (when acting as host for the domain name portfolio management module 19) could be instead communicated directly to the registry operator 20 (when acting as host for the domain name portfolio management module 19), as desired. As such, it is recognized that the registrant 12 itself can communicate directly with services provider 22 for the registration/maintenance information 26 and/or can communicate the registration/maintenance information 26 indirectly with the services provider 22 via the registry operator 20. Further, the registry operator 20 can supply any requested registration/maintenance information 26 (including any payment amounts/data) to the services provider 22 on behalf of the registrant 12.

The domain name portfolio management module 19 monitors and coordinates a plurality of domain name portfolios 24, each with a corresponding portfolio account 25 configured to record and process payments associated with the instructions 26 pertaining to one or more domain names 14, as further described below. Advantageously, the use of single portfolio account 25 for a domain name portfolio 24 allows for the registrant 12 to have a plurality of TLDs (e.g. domain name 14—in the domain name portfolio 24) to share a single/common pool of funds. As such, the structure of a plurality of TLDs in a domain name portfolio 24, as a novel construct, provides of the associated portfolio account 25 to be used as a clearing house of funds pertaining to the activities performed (e.g. by the registry operator 20 as requested by the registrar 16/registrant 12) on any of the multiple TLDs resident (e.g. a member of) the domain name portfolio 24. As such, it can be considered advantageously that the TLDs of the domain name portfolio 25 share a single pool of funds as defined in the portfolio account 25. Further, it can be considered advantageously that access to management functions of any TLD of the multiple TLDs in the domain name portfolio 24 can be accessed by the registrar 18 (and/or registrant 12) via a single login credential pertaining to the portfolio account 25.

It is an advantage of the system 10 to provide registrars 16 (as well as registry operators 20) with an ability to efficiently and straightforwardly register/manage processing of instructions 26 and associated payments for a number of domain names 14, via the domain name portfolio 24, with the corresponding portfolio account 25 common to all of the member domain names 14. As such, the processing of the instructions 26 and the payments provided using a single common financial account (e.g. the portfolio account 25) for the plurality of domain names 14 inhibits any requirement for multiple financial accounts for multiple domain names 14. This arrangement facilitates maintenance and coordination of account balances as a single pool of money (or credit) made available via the common portfolio account 25 to reconcile against the multiple individual instructions 26 (and associated payments 8) for all of the plurality of domain names 14 registered with the portfolio account 25 via membership in the corresponding domain name portfolio 24.

Domain Name Portfolio 24

Figure 2:
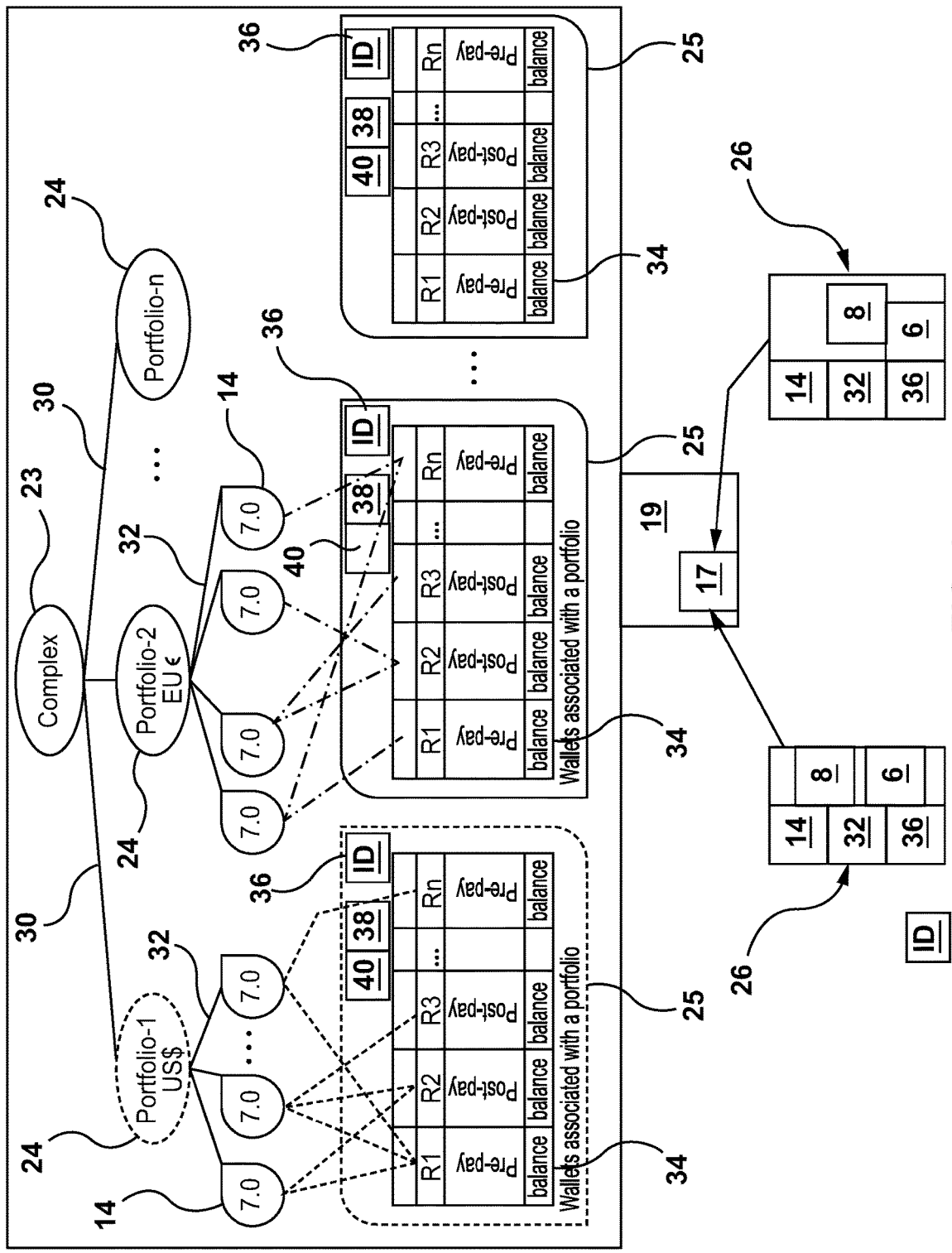
FIG. 2 is a block diagram of an example portfolio management module for the system of FIG. 1.

Referring to FIG. 2, shown is an example domain name portfolio 24 arrangement stored in the storage 23, recognising that the storage can have one or a plurality of different domain name portfolios 24 within the storage 23. In the case of multiple domain name portfolios 24, configuration of the storage 23 can be such that each domain name portfolio 24 can be associated with the same registrar 16, different registrars 16, the same registry operator 20 and/or different registry operators 20, as desired (any one or all of these options can be available). Each domain name portfolio 24 is stored or otherwise linked (e.g. domain name portfolio ID 30) to the storage 23. Each domain name 14 is a member of only one of the domain name portfolios 24 via a portfolio ID 32. It is also recognised that the domain name portfolio 24 and/or the portfolio account 25 can be associated with a registrar ID 38 of the registrar 16 administering the domain names 14 in the domain name portfolio 24 and/or associated with a registry operator ID 40 of the registry operator 20 providing registry operations for the domain names 14 in the domain name portfolio 24 via the registry 18. The portfolio account 25 has a pool of funds 34 common to all domain names 14 in the domain name portfolio 24, a level of the pool of funds 34 can be managed by credited to the portfolio account 25 via the payments 8 and debits (via payments 8) to the portfolio account 25 reflecting any action(s) 6 processed against any of the respective domain names 14 in the domain name portfolio 24.

As such, the pool of funds 34 for any current period (e.g. a calendar month) can be defined as a sum total of any residual funds balance from the previous period plus any payments 8 (or portion thereof) credited to the pool of funds 34 by the domain name portfolio management module 19 minus any payment(s) 8 (or portion thereof) debited from the pool of funds 34 by the domain name portfolio management module 19 reflecting any action(s) 6 performed by the registry operator 20 (or services provider 22) against any of the domain names 14 resident in the domain name portfolio 24. There can be type types of payments 8 with respect to the portfolio account 25, a credit payment 8 that is agnostic (i.e. can be applied as payment for any action 6 on any domain name 14 within the domain name portfolio 24) to any action 6 and/or domain name 14 and a debit payment 8 that is associated with a specific action 6 transacted against a respective domain name 14. Any payments 8 received in the instructions 26 can be associated with the portfolio account 25 via the inclusion of a domain name portfolio ID 32, a domain name 14 resident in the domain name portfolio 24, a portfolio account ID 36, the registrar ID 38, and/or the registry operator ID 40—for credit payments 8 and and/or action(s) 6 associated with debit payments 8. Accordingly, any one or all of the domain name portfolio ID 32, the domain name 14 resident in the domain name portfolio 24, a portfolio account ID 36, the registrar ID 38, and/or the registry operator ID 40 can be used by the domain name portfolio management module 19 to select which of the portfolio accounts 25 should be selected in the storage 23 to receive the payment(s) 8.

Domain Names 14

It is recognized that that the domain names 14 can be such as but not limited to: a set of Top Level Domains (TLDs) of the same second level domain; a set of second level domains (SLDs) of the same third level domain; a set of Top Level Domains (TLDs) of different second level domains; a set of second level domains (SLDs) of different third level domains; and/or lower level domains. As such, second-level and third-level domain names can typically be open for reservation by end-users (registrant 12) who wish to connect local area networks to the Internet 11, create other publicly accessible Internet 11 resources, and/or run web sites. The registration of these domain names 14 is administered by domain name registrars 16 who sell their services to the public (i.e. registrants 12). The TLD names 14 such as .info, .org, .mobi are the highest level of domain names of the Internet 11. Top-level domains form a DNS root zone of a hierarchical Domain Name System implemented on the Internet 11. Every domain name 14 ends with a top-level domain label. Below the top-level domains in the domain name hierarchy are the second-level domain (SLD) names 14. These are the names directly to the left of the top-level domains. As an example, in the domain example.co.info, co is the second-level domain. Second-level domains commonly refer to an organization (e.g. registrant 12) that registered the domain name 14 with the domain name registrar 16. Some domain name registries 18 introduce the second-level hierarchy to the TLD that indicates a type of entity intended to register an SLD under it, for example, in the .org namespace a college or other academic institution could register under the .ac.org ccSLD, while companies could register under .co.org. Next are third-level domain names 14, which are written immediately to the left of the second-level domain, recognising that there can be fourthand fifth-level domains, and so on, with virtually no limitation. As such, it is recognised that a domain name portfolio 24 stored in a storage 23 (further described below) can contain multiple domain names 14 considered as a single group of domain names having common portfolio account 25 with one another to facilitate registration/management of each of the domain names 14 in the domain name portfolio 24, as further described below.

Domain names 14 can be referred to as domains and domain name registrants 12 can be referred to as domain owners, although domain name registration with the registrar 16 may not confer any legal ownership of the domain name 14, only an exclusive right of use for a particular duration of time. As such, the domain name 14 can be considered an economic asset utilized as an identification string defining a realm of administrative autonomy, authority or control within the Internet 11. The domain names 14 are formed by the rules and procedures of the Domain Name System (DNS), such that any name registered in the DNS is a domain name 14. Domain names 14 can also be thought of as a location on the internet 11 where certain information or activities can be found. A fully qualified domain name (FQDN) is a domain name 14 that is completely specified in the hierarchy of the DNS, having no parts omitted.

In terms of importance to functioning of the Internet 11 for searching for and accessing Internet 11 resources, domain names 14 serve as names for these Internet 11 resources such as computers, networks, and services. The domain name 14 represents an Internet Protocol (IP) resource and specifically, individual Internet host computers use domain names 14 as host identifiers, or host names (e.g. leaf labels in the domain name system usually without further subordinate domain name space). Of importance to Internet 11 navigation, host names appear as a component in Uniform Resource Locators (URLs) for Internet 11 resources such as web sites (e.g., Afilias.org). Domain names 14 can also be used as simple identification labels to indicate ownership or control of a resource. Such examples are the realm identifiers used in the Session Initiation Protocol (SIP), the Domain Keys used to verify DNS domains in e-mail systems, and in many other Uniform Resource Identifiers (URIs). An important function of domain names 14 is to provide easily recognizable and memorizable names to numerically addressed Internet 11 resources. Usability of the domain names 14 as an abstraction provides any resource to be moved to different physical locations in the address topology of the network 11, globally or locally in an intranet. Such a move usually involves changing the IP address of the resource and the corresponding translation of this IP address to and from its domain name 14. It is important for the system 10 to facilitate registration/management of the domain names 14 for a particular registrar 16 via a common platform to facilitate processing of instructions 26 and associated payment(s).

Portfolio Management Module 19

The portfolio management module 19 can receive the instructions 26 (e.g. containing actions to register a new domain name 14, renew a registered domain name 14, etc.) with any associated payments and can process the instructions 26 for any domain names 14 included in a domain name portfolio 24 stored in a storage 23, further described below. As such, the portfolio management module 19 can be implemented to handle payment aspects of domain name 14 registration/management relating to the instructions 26, such that each of the domain name portfolios 24 is associated with a corresponding portfolio account 25. The portfolio account 25 can be referred to as a financial account that is funded by the registrar 16 (either directly or on behalf of the registrar 16 by the registry operator 20) for use in applying payment to the services provider 22 and/or the registry operator 20 as compensation for the action(s) (e.g. instructions 26) performed on the domain names 14 in the domain name portfolio 24 (as associated with its portfolio account 25). It is recognized that any registration/management actions contained in the instructions can be processed directly by the service provider 22 and/or can be forwarded to the registry operator 20 for processing. In any event, any payment amounts associated with the instructions 26 are processed by the portfolio management module 19 with regard to which of the domain name portfolios 24 contains the domain name 14, in order to provide for debit/credit of the corresponding portfolio account 25. It is considered an advantage for the registrar 16 to have payments for multiple domain names 14 handled through a common portfolio account 25, as further discussed below.

It is recognized that access to the portfolio management module 19 (of the services provider 22) by the registrar 16 and/or the registry operator 20 can be implemented by one set of login credentials and one set of connections regardless of the number of domain names 14 in one or more domain name portfolios 24. For example, the registrar 16 can use one set of login credentials and one set of connections (considered an advantage to simplify the registrar's 16 or the registry operator's 20 job for registration/maintenance of multiple domain names 14) to access the portfolio management module 19, which is responsible for administering multiple domain name portfolios 24 (each having a corresponding portfolio account 25) assigned to the registrar 16. Each of the domain name portfolios 24 could contain reference to a set of domain name(s) 14 (e.g. two or more domain names 14) to be administered via the corresponding portfolio account 25.

From a registrar 16 standpoint, each registrar 16 can link to an entire set of domain name portfolios 24 in the storage 23 via one set of connections and one set of login credentials per storage 23, as processed by the portfolio management module 19 for example. This means that registrars 16 can access all of their domain names 14 running on the services provider's 22 systems with one set of connections and one set of log in credentials. Each set of connections provides access to all the domain name portfolios 24 (and the domain names 14 within each domain name portfolio 24) resident in the storage 23 that the registrar 16 has been accredited for. From a registry operator 20 standpoint, each registry operator 20 can link to an entire set of domain name portfolios 24 in the storage 23 via one set of connections and one set of login credentials per storage 23, as processed by the portfolio management module 19 for example. This means that registry operators 20 can access all of their domain names 14 running on the services provider's 22 systems with one set of connections and one log in credential. Each set of connections provides access to all the domain name portfolios 24 (and the domain names 14 within each domain name portfolio 24) resident in the storage 23 associated with that registry operator 20. However, as noted, funding (i.e. receipt and processing of the payment data of the instructions 26) however, can be provisioned at the portfolio account 25 level, and each registrar 16 (or registry operator 20) can maintain a single portfolio account 25 per domain name portfolio 24, thus making the single portfolio account 25 common for all domain names 14 resident in the domain name portfolio 24. This portfolio account 25 can be in a single currency, for example, and can fund a pre or post pay model as discussed. Within a domain name portfolio 24, a registrar 16 or registry operator 20 can be either pre or post pay for all the domain names 14 in that domain name portfolio 24.

It is recognized that a particular domain name 14 is only referenced in one of the domain name portfolios 24, such that any actions and associated payments for that particular domain name 14 can only be processed though the corresponding portfolio account 25 for the domain name portfolio 24 containing that particular domain name 14. In other words, a particular domain name 14 cannot be referenced or otherwise belong to two or more domain name portfolios 24, rather the domain name 14—domain name portfolio 24 must be in a one to one relationship. It is also recognized that each domain name portfolio 24 would contain two or more domain names 14 associated with a particular registrar 16. Further, it is recognized that the registrar 16 can have two or more domain name portfolios 24 with corresponding portfolio accounts 25 in the storage 23, as administered by the portfolio management module 19. It is also recognized that the storage 23 can contain respective domain name portfolio(s) 24 for a plurality of different registrars 16, as desired. As such, the present system 10 provides an advantage that payments associated with multiple domain names 14 for a particular registrar 16 can be processed through a common portfolio account 25, as long as all of the multiple domain names 14 associated with the common registrar 16 are included (e.g. members) in the corresponding domain name portfolio 24 assigned to the same registrar 16.

Concerning access to the portfolio management module 19 and associated storage 23 (containing the domain name portfolio 24 with corresponding portfolio account 25 assigned to the registrar 16) by the registrar 16 and/or registry operator 20, the domain name portfolios 24 can represent a number of different domain name 14 implementations under management by the portfolio management module 19. For example, a first domain name 14 implementation can be domain names 14 owned by a registrant 12 that are operated by the services provider 22 performing registry operator functions. A second domain name 14 implementation can be domain names 14 owned by a registry operator 20 (in conjunction with a registrant 16) that are provided registry related services by the service provider 22. The second domain name 14 implementation can include variations such as the domain name portfolio 24 can be comprised of domain names 14 for whom the services provider 22 is collecting payments directly from registrars 16. Another domain name portfolio 24 can be for a registry operator 20 with a number of domain names 14 that prefers to collect their own funds from their registrars 16. While all of the domain name portfolios 24 are accessed via the portfolio management module 19 using the same technical connections (e.g. as facilitated by a SRS—shared registry system) itself, the domain name portfolios 24 are all separate from the standpoint of how the registrar 16 pays for the registrations/maintenance of domain names in that domain name portfolio 24.

Preferably, each portfolio account 25 can use a single currency. For example, a domain name portfolio 24 of multiple domain names 14 (e.g. TLDs) from the same registry operator 20 or registrar 16 would have only one currency. As such, the portfolio account 25 can be considered a mechanism by which the registry 16 (or registry operator 20) can use to pair two or more sets of instructions 26 together for payments based on transactions (e.g. actions) against one or more of the domain names 14 (e.g. TLDs) associated with the same domain name portfolio 24 belonging to the common portfolio account 25. In other words, all payments pertaining to any domain name 14 in the domain name portfolio 24 are processed through the same portfolio account 25 assigned to that domain name portfolio 24.

Payment Models

As mentioned above, the portfolio management module 19 can be hosted by the services provider 22 and/or by the registry operator 20, either or both of which can be in communication with the registrar 16 in order to receive the instructions 26 (including any payment data). As such, the portfolio management module 19 can be used by the services provider 22 to process any payment data included in the instructions 26. As further described below, it is recognized that specification of payment can accompany any defined action(s) (i.e. to be applied to objects in the registry 18 associated with the domain name(s) 14) contained in the instructions 26. Alternatively, specification of payment data can be supplied as instructions 26 separate from (either prior to or post) receipt and processing of separate instructions 26 containing the action(s) as a transaction against one or more objects of the domain names 14 in the registry 18. In the event that instructions 26 containing payment data (e.g. specifying either a particular domain name 14 and/or a particular domain name portfolio 24 and/or a particular portfolio account 25 belonging to the registrar 16 along with a payment amount) is provided as instructions 26 before any action(s) are transacted against objects of the domain name(s) 14 in the registry 18, this arrangement can be considered as a pre-pay environment.

A pre-pay environment or model is where each accredited registrar 16 (or registry operator 20) maintains a balance of their portfolio account 25 for a selected domain name portfolio 24, from which deductions are made as transactions (i.e. processing of action(s) contained in the instructions 26) occur for the domain names 14 in that domain name portfolio 24. For example, one version of the pre-pay model is such that the services provider 22 receives funds (e.g. payment data) in advance from the registrar 16 (or registry operator 20). In this model, the registrar 16 (or registry operator 20 on behalf of the registrar 16) remits funds directly to the services provider 22 via payment instructions 26, and the services provider 22 provides that a deposit (representing a payment amount defined by the payment data) is promptly credited to the appropriate portfolio account 25. There pre-pay model can have an number of advantages, such as, first the registrar 16 has fewer accounts to manage (and fewer wire fees), as they send the money to the services provider 22 and the services provider 22 deposits it into the proper portfolio account 25. Secondly, the registry operator 20 doesn't need to dedicate finance resources to monitor and manage deposits on an individual basis for each and every action applied to each and every domain name 14 on a one to one basis.

Further, a second version of the pre-pay model is such that the registry operator 20 receives funds from the registrar 16. If the registry operator 20 decides to manage the funds from the registrar 16, it will be the registry operator's 20 responsibility to also manage the balance in the registrar's 16 account in the registry operator's 20 domain name portfolio 24 with the services provider 22. In this case, the services provider 22 can provide an interface with the portfolio management module 19 that facilitates the registry operator 20 to adjust the balances for the individual registrars 16 contained within the registry operator's 20 domain name portfolio 24. In this model, the registry operator 20 has to dedicate financial resources to provide it can track and properly credit funds from each registrar 16 to the appropriate portfolio account 25. As such, the registry operator 20 would have its own dedicated domain name portfolio 24 and associated portfolio account 25.

In the event that instructions 26 containing payment data (e.g. specifying either a particular domain name 14 and/or a particular domain name portfolio 24 and/or a particular portfolio account 25 belonging to the registrar 16 along with a payment amount) is provided as instructions 26 after any action(s) are transacted against objects of the domain name (s) 14 in the registry 18, this arrangement can be considered as a post-pay environment.

A post-pay environment or model is where each accredited registrar 16 (or registry operator 20) maintains a balance of their portfolio account 25 for a selected domain name portfolio 24, from which deductions are made after transactions (i.e. processing of action(s) contained in the instructions 26) occur for the domain names 14 in that domain name portfolio 24. For example, one version of the post-pay model is such that credit to the registrar 16 (or the registry operator 20) is granted by the services provider 22 during a time period (e.g. the month) as transactions occur against the objects of the domain names 14 in the domain name portfolio 24, and then the services provider 22 bills the registrar 16 (or the registry operator 20) at month end with some conditions for payment timing (e.g. 30 days, 45 days, etc). As such, under the post-pay model the instructions 26 containing payment data is received after any instructions 26 containing action(s) for application against the domain names 24 in the domain name portfolio 24. One example of this post-pay model is where the registry operator 20 receives funds from the registrar 16, such that the registry operator 20 collects the funds from the registrar 16 and manages the registrar's 16 portfolio account 25.

In all of the above, it is recognised that the instructions 26 (containing action(s) and/or payment data) can be; 1) received by the registry operator 20 from the registrar 16, 2) received by the services provider 22 from the registrar 16, and/or 3) received by the services provider 22 from the registry operator 20. In the case where the services provider 22 is managing the domain name portfolio 24 and associated portfolio account 25, it is recognised that any action(s) received in the instructions 26 by the services provider 22 can be forwarded to the registry operator 20 and any payment data received in the instructions 26 by the registry operator 20 can be forwarded to the services provider 22. In the case where the registry operator 20 is managing the domain name portfolio 24 and associated portfolio account 25, it is recognised that any action(s) received in the instructions 26 by the services provider 22 can be forwarded to the registry operator 20 and any payment data received in the instructions 26 by the services provider 22 can be forwarded to the registry operator 20.

In either payment model, the registry operator 20 can receive periodic (e.g. monthly) invoices and statements 27 from the services provider 22 along with the detailed transactions (i.e. actions) associated with the invoice 27. The registry operator 20 statements and invoices 27 can be generated by the portfolio management module 19 at a specified domain level (e.g. the TLD level), so a registry operator 20 with multiple domain names 14 (e.g. TLDs) can receive a separate invoice and statement 27 for each domain name 14 (e.g. TLD). For example, if the registry operator 20 has multiple domain names 14 (e.g. TLDs) in a dedicated domain name portfolio 24, statements and invoices 27 can be provided on a consolidated basis for all the domain names 14 (e.g. TLDs) in that domain name portfolio 24. In this example, any services provider 22 fees can appear in both the invoice and the statement 27. Further, for the registrars 16, the services provider 22 can create portfolio level invoices and statements 27, along with the detailed transactions associated with the invoice 27. Accordingly, the registry operator 20 and the registrar 16 can receive detailed statements and invoices 27 providing reporting of the results of the applied action(s) and payment(s) from their instructions 26 against domain names 14 resident in each of their domain name portfolios 24.

Instructions 26

The instructions 26 pertaining to registration and maintenance of domain names 14 in the domain name portfolios 24 involves management of objects associated with each of the domain names 14 in the domain name portfolio 24. These objects are populated with appropriate data based on action(s) performed on the objects (e.g. update/modification, delete/del, transfer, renew, etc.) as specified in the instructions 26. Further, as noted above, some of the actions can require the payment (e.g. containing an actual credit/debit instruction for an amount to be processed by a financial institution 21 or containing a reference amount independent of the financial institution 21) as compensation for the action being performed (e.g. payment to the registry operator 20 and/or the service provider 22 for registration of a new domain name 14 as requested by the registrar 16 on behalf of a registrant 12).

One example of the instructions 26 is a new domain name 14 registration with associated payment that is received by the registry operator 20 from the registrar 16, recognizing that the domain name 14 is part of a domain name portfolio 24 stored in the storage 23. As the domain name portfolio 24 and corresponding portfolio account 25 are hosted by the service provider 22, the registry operator 20 could perform any action(s) included in the instructions 26 and then forward a record of the action(s) performed as well as the corresponding payment to the services provider 22 for application against the corresponding portfolio account 25 for the domain name portfolio 24 containing the domain name(s) 14 associated with the instructions 26. As shown in FIG. 2, the instructions 26 can include one or more actions 6, one or more domain names 14, and one or more payments 8, such that in this example the actions 6 are performed by the registry operator 20 and only a record of the actions 6 is forwarded by the registry operator 20 to the services provider 22 in the instructions 26 rather than the actions 6 themselves, for example.

Once the services provider 22 receives the instructions 26 containing the record of the actions 6, reference to the one or more domain names 14, and the one or more payments 8, the portfolio management module 19 can process the payments 8 on the respective portfolio account 25 pertaining to the domain name portfolio 24 in which the domain name(s) 14 are referenced.

It is recognized that if the services provider 22 receives the instructions 26 directly from the registrar 16, then the services provider 22 can retain a record of any of the actions 6 before forwarding the actions 6 for processing by the registry operator 20. As mentioned above, instructions 26 containing action(s) 6 for processing by the registry operator 20 can be transmitted by the registrar 16 over the network 11 separately from the instructions 26 containing the payments 8 information.

Another example of the instructions 26 is a new domain name 14 registration with associated payment that is received by the services provider 22 from the registrar 16, recognizing that the domain name 14 is part of a domain name portfolio 24 stored in the storage 23. As only the domain name portfolio 24 and corresponding portfolio account 25 are hosted by the service provider 22, after receipt of the instructions 26, the service provider 22 could contact the registry operator 20 for performance of any action(s) 6 included in the instructions 26 and any corresponding payment (e.g. portion or all of the payment 8) for service. In addition, the service provider 22 could apply, via the portfolio management module 19, the payment 8 (or portion thereof for the action(s) 6 performed) against the corresponding portfolio account 25 for the domain name portfolio 24 containing the domain name(s) 14 of the instructions 26.

Another example of the instructions 26 is renewal of an existing domain name 14 registration with associated payment that is received by the registry operator 20 from the registrar 16, recognizing that the domain name 14 is part of a domain name portfolio 24 stored in the storage 23. As the domain name portfolio 24 and corresponding portfolio account 25 are hosted by the service provider 22, the registry operator 20 could perform any action(s) included in the instructions 26 and then forward a record of the action(s) performed as well as the corresponding payment to the services provider 22 for application against the corresponding portfolio account 25 for the domain name portfolio 24 containing the domain name(s) 14 associated with the instructions 26. As shown in FIG. 2, the instructions 26 can include one or more actions 6, one or more domain names 14, and one or more payments 8, such that in this example the actions 6 are performed by the registry operator 20 and only a record of the actions 6 is forwarded by the registry operator 20 to the services provider 22 in the instructions 26 rather than the actions 6 themselves. Once the services provider 22 receives the instructions 26 containing the record of the actions 6, reference to the one or more domain names 14, and the one or more payments 8, the portfolio management module 19 can process the payments 8 on the respective portfolio account 25 pertaining to the domain name portfolio 24 in which the domain name(s) 14 are referenced.

Another example of the instructions 26 is renewal of an existing domain name 14 registration with associated payment that is received by the services provider 22 from the registrar 16, recognizing that the domain name 14 is part of a domain name portfolio 24 stored in the storage 23. As only the domain name portfolio 24 and corresponding portfolio account 25 are hosted by the service provider 22, after receipt of the instructions 26, the service provider 22 could contact the registry operator 20 for performance of any action(s) 6 included in the instructions 26 and any corresponding payment (e.g. portion or all of the payment 8) for service. In addition, the service provider 22 could apply, via the portfolio management module 19, the payment 8 (or portion thereof for the action(s) 6 performed) against the corresponding portfolio account 25 for the domain name portfolio 24 containing the domain name(s) 14 of the instructions 26.

Service Provider 22

Referring again to FIG. 1, the registry services provider 22 can be responsible for services/capabilities facilitating smooth and efficient operation of any type of domain registry 18. For example, the registry services provider 22 can provide to the registry operator 18 a standards-based, EPP registry system facilitating a reliable, secure platform for domain operations. Further, the registry services provider 22 can provide a distributed DNS system facilitating domain availability on the Internet 11 coupled with provision of state of the art security against attack and abuse. Further, the registry services provider 22 can provide launch or improvement assistance for the domains identified by the domain names 14 contained in the domain name portfolio 24. Further, the registry services provider 22 can provide registry solutions and accommodate policy needs for the domain. It is also recognized that the registry services provider 22 can implement all or a subset of the registry functionality and support services on behalf of the registry operator 20 (for example the registry services provider 22 can be the registry operator 20 for a selected domain names 14).

Registration and maintenance of domain names 14 in the domain name bundle 13 involves management of objects associated with each of the domain names 14 in the domain name portfolio 24. These objects are populated with appropriate data based on action(s) performed on the objects (e.g. update/modification, delete/del, transfer, renew, etc.). Example actions on the objects for the domain names 14 are such as registration/purchase of the domain names 14 by the registrant 12 from the registrar 16. Other example actions on the objects can include management by the Registry Operator 20 of up-to-date data in the objects concerning domain name and name server registrations maintained by the Registry Operator 20, useful in verifying and providing operational stability of Registry Services and the DNS.

It is recognised that the entities 12, 16, 18, 20, 22, 23 can interact on the network 11 with one another in client server pairs. For example, the registrar 16 can be the EPP client and the registry 18 (with associated registry operator 20) can be the paired EPP server. In general, an EPP server responds to a successful connection by returning a greeting to the client. The client waits for the greeting before sending an EPP command (i.e. action) to the server. EPP commands and responses are exchanged serially between the client and the server over the network 11, in order to affect the data contents of the corresponding objects which are acted upon by the action implemented by the server (i.e. as requested by the client). The server responds to each EPP command with a coordinated response that describes the results of processing the command.

EPP commands can fall into three categories: session management commands, query commands, and data transform commands. Session management commands are used to establish and end sessions with an EPP server. Query commands are used to perform read-only, object-based information retrieval operations with respect to data contents of the objects. Transform commands are used to perform read-write object management operations with respect to the data contents of the objects.

EPP provides commands to manage sessions, retrieve object information, and perform transformation operations on objects. All EPP commands are atomic and idempotent, either succeeding completely or failing completely and producing predictable results in case of repeated execution. EPP provides three commands/actions to retrieve object information: action <info> to retrieve detailed information associated with a known object, action <ping> to determine if an object is known to the server, and action <transfer> to retrieve known object transfer status information. EPP provides five commands/actions to transform (i.e. modify the data contents of the object) objects: action <create> to create an instance of an object with a server, action <delete> to remove an instance of an object from a server, action <renew> to extend the validity period of an object, action <update> to change information associated with an object, and action <transfer> to manage changes in client sponsorship (e.g. change in registrant 12) of a known object. As such, instance of an object refers to the specific data contents of an object. EPP uses four decimal digits to describe the success or failure of each EPP command. The four digits of the reply each have special significance. The first digit denotes whether the response submitted by the server back to the client marks command success or failure. A client that wants to know approximately what kind of error occurred (command syntax error, security error, system error, etc.) can examine the second digit. The third and fourth digits are used to provide explicit information detail by the server to the client with respect to the results of command execution and object data contents change thereby.

As discussed above, the system 10 implementing the domain name portfolio 24 with associated portfolio account 25 can provide a number of advantages for the registrar 16 and/or the registry operator 20, for example:

1. Fewer logins and connections, i.e. registration/maintenance support for all domain names 14 running on the services provider 22 can be accessed by just one login credential and one connection sets for each domain name portfolio 24;
2. Fewer accounts (account balances at the registry 18) to manage, i.e. registrars 16 or registry operators 20 who carry all their domain names 14 with the services provider 22 could need to manage only as many account balances as there are portfolio accounts 25 in the storage 23;
3. Simplified statements/invoices, i.e. each registrar 16 and/or registry operator 20 can receive consolidated statements and invoices 27 at the domain name portfolio 24 level, for example a registrar 16 could handle all their domain names 14 with one statements/invoices 27 from each domain name portfolio 24 in the storage 23; and
4. Low Balance Threshold notices for a registrar 16 or registry operator financial account with the services provider 22 can now be relevant to only the single portfolio account 25 associated with the domain name portfolio 24, not for each of the individual domain names 14 within the storage 23, thus further reducing complexity for account balancing.

Operation of the System 10

Figure 4:
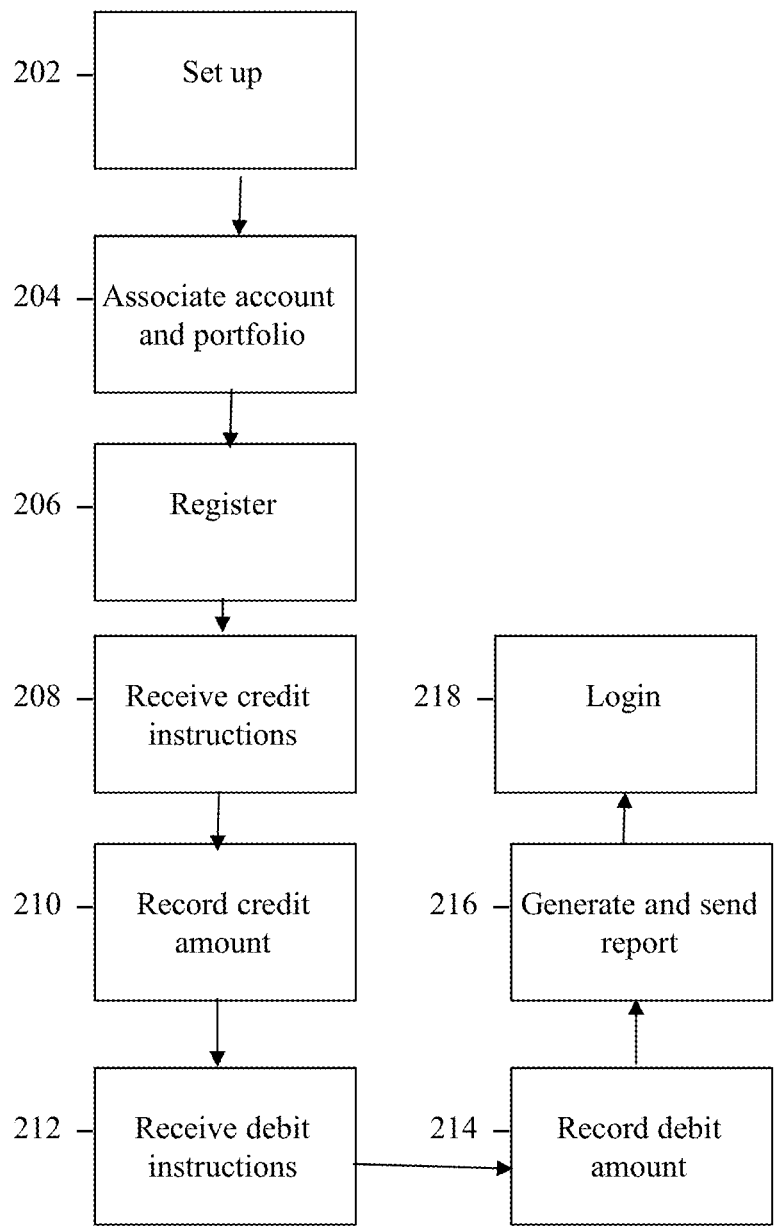
FIG. 4 is an example operation of the system of FIG. 1.

Referring to FIGS. 1 and 4, the domain name management and registration system 10 can provide for the domain name registrant 12 to register and/or manage over the communications network 11 the domain name 14, via the domain name registrar 16, using instructions 26 and any associated payments relating to their domain names 14 already registered (e.g. claimed) in the domain name registry 18. The domain name management and registration system 10 includes the domain name portfolio management module 19 that can be hosted by the service provider 22 (e.g. technical services provider to the registry operator 20) or can be hosted by the registry operator 20 themselves. The instructions 26 themselves can be received by a network (e.g. web) interface 17 of the portfolio management module 19 from the registrant 12, from the registrar 16, and/or the registry operator 20. In the case of the registry operator 20 hosting the portfolio management module 19, then the portfolio management module 19 could receive the instructions 26 from the services provide 22.

As shown in FIG. 2, the instructions 26 can include one or more actions 6, one or more domain names 14, and one or more payments 8, such that in this example the actions 6 are performed by the registry operator 20 and only a record of the actions 6 is forwarded by the registry operator 20 to the services provider 22 in the instructions 26 rather than the actions 6 themselves. Once the services provider 22 receives the instructions 26 containing the record of the actions 6, reference to the one or more domain names 14, and the one or more payments 8, the portfolio management module 19 can process the payments 8 on the respective portfolio account 25 pertaining to the domain name portfolio 24 in which the domain name(s) 14 are referenced.

As noted above, processing of the instructions 26 and the payments provided using the single common financial account (e.g. the portfolio account 25) for the plurality of domain names 14 inhibits any requirement for multiple financial accounts for multiple domain names 14. This arrangement facilitates maintenance and coordination of account balances as the single pool of money (or credit) made available via the common portfolio account 25 to reconcile against the multiple individual instructions 26 (and associated payments) for all of the plurality of domain names 14 registered with the portfolio account 25 via membership in the corresponding domain name portfolio 24. It is recognized that the multiple individual instructions 26 would be received by the domain name portfolio management module 19 as separate communications over the network 11 during the period (e.g. monthly) between receipt of concurrent debit payment amounts 8 for deposit into the portfolio account 25.

Referring to FIG. 4, shown is an example operation 200 for coordinating transactions for domain names 14. At step 202, the portfolio management module 19 sets up the domain name portfolio 24 by registering a plurality of domain names 14 with the domain name portfolio 24 stored in the storage 23, such that each of the domain names 14 in the plurality of domain names belongs to only the domain name portfolio 24 as a unique member of the domain name portfolio 24. At step 204, the portfolio management module 19 associates or otherwise links the portfolio account 25 with the domain name portfolio 24, such that the portfolio account 25 is configured for use by the portfolio management module 19 in managing the pool of funds available 34 for payment of the transactions for each of the domain names 14 of the plurality of domain names. At step 206, the registrar 16 (or registry operator 20) registers with the portfolio management module 19 via a network interface 17 (e.g. a Web service interface) by a set of login credentials and a set of connections. At step 208, the portfolio management module 19 via the network interface 17 receives the credit payment instructions 26 attributed to the portfolio account 25, the credit payment instructions 26 containing a credit payment amount 8. At step 210, the portfolio management module 19 records the credit payment amount 8 against the pool of funds 34 in order to increase a level of the pool of funds 34. At step 212 the portfolio management module 19 via the network interface 17 receives the debit payment instructions 26 associated with the domain name 14 of the domain name portfolio 24 and domain name transaction information 26 associated with the transaction for the domain name 14, recognising that the instructions 26 can come concurrently or separately via the network 11 as desired. At step 214, the portfolio management module 19 records the debit payment amount 8 against the pool of funds 34 in order to decrease the level of the pool of funds 34 and at step 216 generates and sends a periodic report over the network 11 detailing the level of the pool of funds 34 and the transaction applied against two or more of the domain names 14 as members of the domain name portfolio 24. It is also recognised that in the case where a financial institution is involved, as step 218 the portfolio management module 19 receives the credit payment instructions containing financial instruction data; and forwards the credit payment amount with the financial institution data to a financial institution for processing against a financial account of a registrar hosted by the financial institution with the credit payment amount or a debit payment amount.

Example Storage 18, 23

In view of the above descriptions of storage 18, 23 for the computer devices 100 (see FIG. 3) of registry operator 20, services provider 22 and registrar 16, storage 18, 23 can be configured as keeping the stored data (e.g. domain name 14, domain name portfolio 24, portfolio account 25 respectively) in order and the principal (or only) operations on the stored data are the addition/amendment of or removal of the stored data from storage 18, 23 (e.g. FIFO, FIAO, etc.). For example, storage 18, 23 can be a linear data structure for containing and subsequent accessing of the stored data and/or can be a non-linear data structure for containing and subsequent accessing of the stored data.

Further, storage 18, 23 receives various entities such as data that are stored and held to be processed later. In these contexts, storage 18, 23 can perform the function of a buffer, which is a region of memory used to temporarily hold data while it is being moved from one place to another (i.e. between the between computer devices 100). Typically, the data is stored in the memory when moving the data between processes within/between one or more computers. It is recognised that storage 18, 23 can be implemented in hardware, software, or a combination thereof. The storage 18, 23 is used in the network system 10 when there is a difference between the rate/time at which data is received and the rate/time at which the data can be processed (e.g. ultimately by the devices 100).

Further, it will be understood by a person skilled in the art that memory/storage 18, 23 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 18, 23 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 18, 23 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 18, 23 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server, it is recognised that the computer devices 100 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 11. The computer devices 100 implementing functionality of registry operator 20, the registrar 16 and the services provider 22 can provide specialized services across the network 11, for example to private users inside a large organization or to public users via the Internet 11. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 11 environment. In this client—server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Example of Computer Device 100

Figure 3:
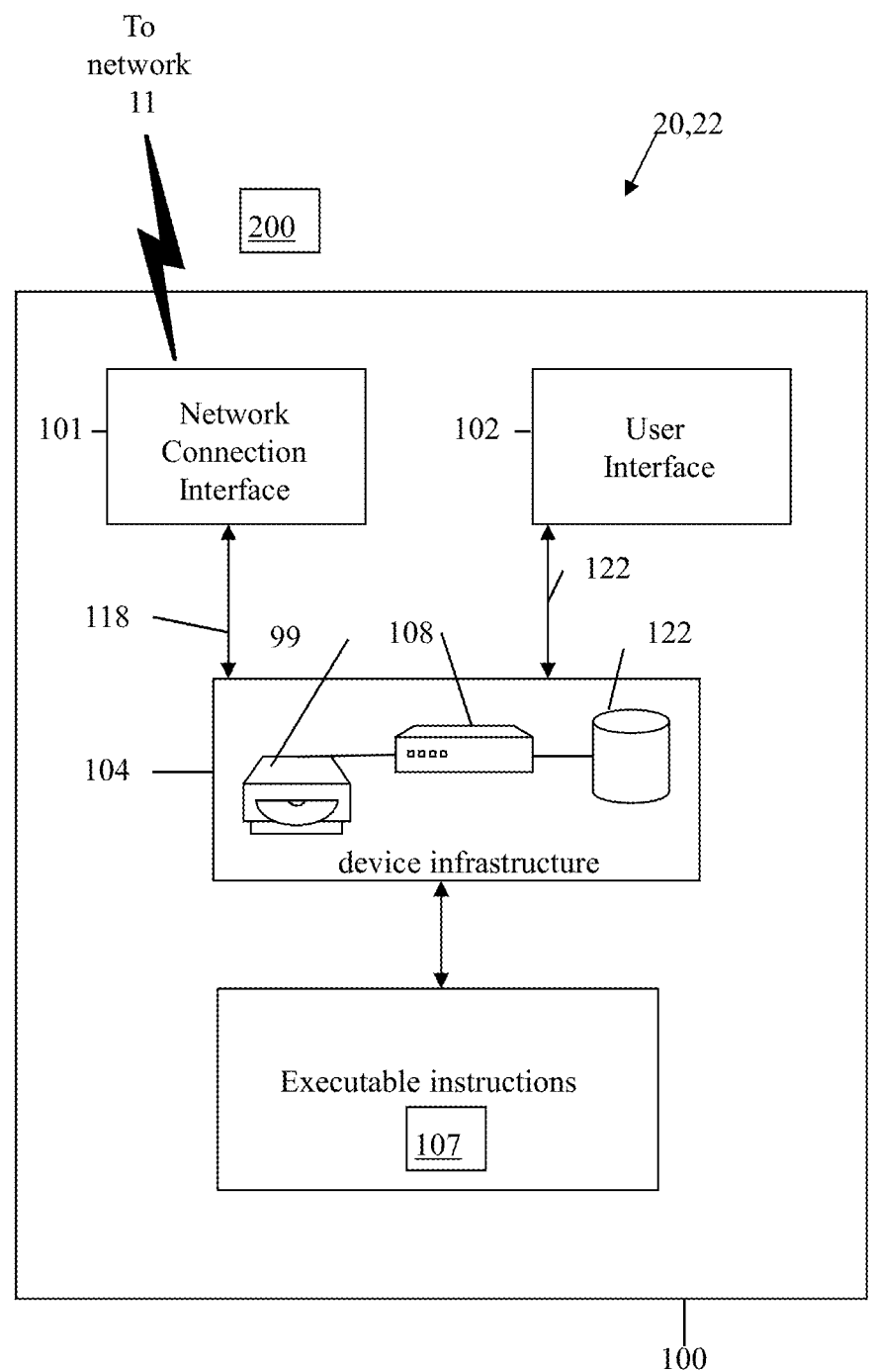
FIG. 3 is an example configuration of a computer device hosting the directory subscription service of FIG. 2.

Referring to FIG. 3, a computing device 100 implementing functionality of registry operator 20, the registrar 16 and the services provider 22 can include a network interface 101, such as a network interface card or a modem, coupled via connection 118 to a device infrastructure 104. The connection interface 101 is connectable during operation of the devices to the network 11 (e.g. an intranet and/or an extranet such as the Internet), which enables the devices to communicate with each other as appropriate. The network 11 can support the communication of the communications 26 and the related content.

Referring again to FIG. 3, the device 100 can also have a user interface 102, coupled to the device infrastructure 104 by connection 122, to interact with a user (e.g. server administrator—not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 3, operation of the device 100 is facilitated by the device infrastructure 104. The device infrastructure 104 includes one or more computer processors 108 and can include an associated memory 122 (e.g. memory 18, 23). The computer processor 108 facilitates performance of the device 100 configured for the intended task (e.g. of the respective module(s) 19 of services provider 22) through operation of the network interface 101, the user interface 102 and other application programs/hardware of the device 100 by executing task related instructions. These task related instructions can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium 99 coupled to the processor 108 for providing instructions to the processor 108 and/or to load/update the instructions 107 (e.g. module 19). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine readable instructions for implementing predetermined functions/operations including those of an operating system and the modules, for example. The processor 108 as used herein is a configured device and/or set of machine-readable instructions for performing operations as described by example above, including those operations as performed by any or all of the module 19. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the services provider 22 can include one or more of the computing devices 100 (comprising hardware and/or software) for implementing the modules, as desired.

It will be understood in view of the above that the computing devices 100 may be, although depicted as a single computer system, may be implemented as a network of computer processors, as desired.

We claim:

1. A system for addressing reliability of registry services and Domain Name systems (DNS) by coordinating transactions for multiple domain names associated with a registrar or a registry operator, the system comprising:
   a computer processor coupled to a memory for implementing instructions stored on the memory to:
   register via a portfolio management module a plurality of domain names with a domain name portfolio stored in a storage, such that each of the domain names in the plurality of domain names belongs to only the domain name portfolio as a unique member of the domain name portfolio;
   associate a common portfolio account with the domain name portfolio, the common portfolio account configured for managing a pool of funds available for use in payment of the transactions for said each of the domain names of the plurality of domain names, the transactions concerning operations performed on objects associated with each of the plurality of domain names;
   receive a single set of login credentials associated with the common portfolio account, such that the common portfolio account is associated with each of the plurality of domain names in the domain name portfolio;
   set up a designated set of connections on a communications network upon acceptance of the single set of login credentials, the designated set of connections for use in coordinating payment for all of the plurality of domain names, such that the domain name portfolio contains corresponding references to each of the plurality of domain names;
   receive credit payment instructions attributed to the common portfolio account, the credit payment instructions containing a credit payment amount;
   recording the credit payment amount against the pool of funds in order to increase a level of the pool of funds;
   receive debit payment instructions associated with a domain name of the domain name portfolio and domain name transaction information associated with the transaction for the domain name;
   recording the debit payment amount against the pool of funds in order to decrease the level of the pool of funds; and
   generating and sending a periodic report over the network detailing the level of the pool of funds and the transaction applied against two or more of the domain names as members of the domain name portfolio;
   wherein the registrar or the registry operator links to all of the plurality of domain names in the domain name portfolio via the designated set of connections using the single set of login credentials.

2. The system of claim 1, wherein the credit payment instructions are processed by the portfolio management module prior to receipt of the debit payment instructions.

3. The system of claim 1, wherein the credit payment instructions are processed by the portfolio management module after receipt of the debit payment instructions.

4. The system of claim 1, wherein any of the credit payment instructions or the debt payment instructions are received directly from a registrar over a communications network connected to a network interface of the portfolio management module.

5. The system of claim 1, wherein any of the credit payment instructions or the debt payment instructions associated with a registrar are received directly from a registry operator over a communications network connected to a network interface of the portfolio management module.

6. The system of claim 1, wherein the portfolio management module is hosted on a server of a registry operator providing registry operations for the plurality of domain names.

7. The system of claim 1, wherein the portfolio management module is hosted on a server of a services provider in communication with a registry operator providing registry operations for the plurality of domain names.

8. The system of claim 1, wherein the credit payment instructions are agnostic with respect to any of the plurality of domain names in the domain name portfolio.

9. The system of claim 1, wherein the transaction information is a defined action for application against an object of the domain name in a registry.

10. The system of claim 1, wherein the transaction information is record of a defined action for application against an object of the domain name in a registry.

11. The system of claim 1, wherein the transaction information is record of a defined action already applied against an object of the domain name in a registry.

12. The system of claim 9, wherein the defined action is selected from the group consisting of: registration; maintenance; transfer and renewal.

13. The system of claim 1, wherein the credit payment instructions includes a domain name ID for associating the credit payment amount with the pool of funds.

14. The system of claim 1, wherein the credit payment instructions includes a portfolio account ID for associating the credit payment amount with the pool of funds.

15. The system of claim 1, wherein the credit payment instructions includes a domain name portfolio ID for associating the credit payment amount with the pool of funds.

16. The system of claim 1, wherein the credit payment instructions includes a registrar ID or a registry operator ID for associating the credit payment amount with the pool of funds.

17. The system of claim 1, wherein the debit payment instructions includes a domain name ID for associating the debit payment amount with the pool of funds.

18. The system of claim 1, wherein the debit payment instructions includes a portfolio account ID for associating the debit payment amount with the pool of funds.

19. The system of claim 1, wherein the debit payment instructions includes a domain name portfolio ID for associating the debit payment amount with the pool of funds.

20. The system of claim 1, wherein the debit payment instructions includes a registrar ID or a registry operator ID for associating the debit payment amount with the pool of funds.

21. The system of claim 1, wherein the plurality of domain names belongs to a common Top Level Domain (TLD).

22. The system of claim 1, wherein the plurality of domain names belongs to a common Second Level Domain (SLD).

23. The system of claim 1, wherein the instructions further comprise registering the registrar with the portfolio management module by the single set of login credentials and the designated set of connections for use in submitting any of the credit payment instructions or the debit payment instructions pertaining to any of the domain names of the plurality of domain names; wherein the credit payment instructions or the debit payment instructions also pertain to a second domain name portfolio, such that the second domain name portfolio contains a second plurality of domain names, the plurality of domain names different from the second plurality of domain names; wherein the registrar links to all of the second plurality of domain names in the second domain name portfolio via the designated set of connections using the single set of login credentials, such that a particular domain name is restricted from belonging to both the domain name portfolio and the second domain name portfolio.

24. The system of claim 1, wherein the instructions further comprise registering the registry operator with the portfolio management module by the set of login credentials and the designated set of connections for use in submitting any of the credit payment instructions or the debit payment instructions pertaining to any of the domain names of the plurality of domain names; wherein the credit payment instructions or the debit payment instructions also pertain to a second domain name portfolio, such that the second domain name portfolio contains a second plurality of domain names, the plurality of domain names different from the second plurality of domain names; wherein the registrar links to all of the second plurality of domain names in the second domain name portfolio via the designated set of connections using the single set of login credentials, such that a particular domain name is restricted from belonging to both the domain name portfolio and the second domain name portfolio.

25. The system of claim 1, wherein the instructions further comprise:
    receiving the credit payment instructions containing financial instruction data; and
    forwarding the credit payment amount with the financial institution data to a financial institution for processing against a financial account of a registrar hosted by the financial institution with the credit payment amount or a debit payment amount.

26. The system of claim 1, wherein the instructions further comprise:
    receiving the credit payment instructions containing financial instruction data; and
    forwarding the credit payment amount with the financial institution data to a financial institution for processing against a financial account of a registry operator hosted by the financial institution with the credit payment amount or a debit payment amount.

27. The system of claim 1, wherein the common portfolio account is assigned to the registrar pertaining to the domain name portfolio of the domain names administered by the registrar.

28. The system of claim 1, wherein the common portfolio account is assigned to the registry operator pertaining to the plurality of domain names operated by the registry operator via a registry.

29. A method for addressing reliability of registry services and Domain Name systems (DNS) by coordinating transactions multiple domain names associated with a registrar or a registry operator, the method implemented on a computer processor coupled to a memory via instructions stored on the memory to:
    register a plurality of domain names with a domain name portfolio stored in a storage, such that each of the domain names in a plurality of domain names belongs to only the domain name portfolio as a unique member of the domain name portfolio;

associate a common portfolio account with the domain name portfolio, the common portfolio account configured for managing a pool of funds available for use in payment of the transactions for said each of the domain names of the plurality of domain names, the transactions concerning operations performed on objects associated with each of the plurality of domain names;

receive a single set of login credentials associated with the common portfolio account, such that the common portfolio account is associated with each of the plurality of domain names in the domain name portfolio;

set up a designated set of connections on a communications network upon acceptance of the single set of login credentials, the designated set of connections for use in coordinating payment for all of the plurality of domain names, such that the domain name portfolio contains corresponding references to each of the plurality of domain names;

receive credit payment instructions attributed to the common portfolio account, the credit payment instructions containing a credit payment amount;

recording the credit payment amount against the pool of funds in order to increase a level of the pool of funds;

receive debit payment instructions associated with a domain name of the domain name portfolio and domain name transaction information associated with the transaction for the domain name;

recording the debit payment amount against the pool of funds in order to decrease the level of the pool of funds; and generating and sending a periodic report over the network detailing the level of the pool of funds and the transaction applied against two or more of the domain names as members of the domain name portfolio;

wherein the registrar or the registry operator links to all of the plurality of domain names in the domain name portfolio via the designated set of connections using the single set of login credentials.

\* \* \* \* \*